United States Patent
MacDonald et al.

(10) Patent No.: US 9,326,150 B2
(45) Date of Patent: Apr. 26, 2016

(54) COMMUNITY WI-FI NETWORK JOINED ACCESS POINT CONFIGURATION

(71) Applicants: David Neil MacDonald, Seattle, WA (US); Piyush Goyal, Redmond, WA (US); Saumaya Sharma, Seattle, WA (US); Shai Guday, Redmond, WA (US); Thomas Werner Kuehnel, Seattle, WA (US); Darya Mazandarany, Kirkland, WA (US); Triptpal Singh Lamba, Bothell, WA (US); Brent Edward Ford, Sammamish, WA (US)

(72) Inventors: David Neil MacDonald, Seattle, WA (US); Piyush Goyal, Redmond, WA (US); Saumaya Sharma, Seattle, WA (US); Shai Guday, Redmond, WA (US); Thomas Werner Kuehnel, Seattle, WA (US); Darya Mazandarany, Kirkland, WA (US); Triptpal Singh Lamba, Bothell, WA (US); Brent Edward Ford, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 14/071,650

(22) Filed: Nov. 5, 2013

(65) Prior Publication Data
US 2015/0124641 A1 May 7, 2015

(51) Int. Cl.
*H04L 12/28* (2006.01)
*H04W 16/00* (2009.01)
(Continued)

(52) U.S. Cl.
CPC .............. *H04W 16/00* (2013.01); *H04W 24/02* (2013.01); *H04W 84/02* (2013.01); *H04W 84/18* (2013.01); *H04W 88/00* (2013.01)

(58) Field of Classification Search
CPC ....................................................... H04L 41/12
USPC ......................................................... 370/254
See application file for complete search history.

(56) References Cited

U.S. PATENT DOCUMENTS

| 7,263,076 B1 * | 8/2007 | Leibovitz et al. ............. 370/310 |
| 2006/0030330 A1 * | 2/2006 | Black ........................... 455/446 |

(Continued)

FOREIGN PATENT DOCUMENTS

| WO | 02/01893 A2 | 1/2002 |
| WO | 2004/079997 A1 | 9/2004 |
| WO | 2013/041033 A1 | 3/2013 |

OTHER PUBLICATIONS

Tetz, Edward, "Multiple SSIDs with a Single Access Point (AP)," Retrieved at <<http://www.dummies.com/how-to/content/multiple-ssids-with-a-single-access-point-ap.html>>, May 12, 2012, pp. 1-3.

(Continued)

*Primary Examiner* — Samina Choudhry
(74) *Attorney, Agent, or Firm* — Judy Yee; Micky Minhas

(57) ABSTRACT

Various technologies described herein pertain to configuring an access point in a local network for operation in a community Wi-Fi network. The community Wi-Fi network includes access points in differing local networks that share respective network bandwidth capacities with member computing devices of the community Wi-Fi network. A request to join the access point to the community Wi-Fi network is transmitted from the access point to a community aggregation system. Responsive to the request, the community aggregation system transmits a firmware update to the access point. The access point installs the firmware update in memory of the access point. Moreover, responsive to installation of the firmware update, the access point can share network bandwidth capacity with the member computing devices of the community Wi-Fi network. Further, the community aggregation system supports transparent handoffs between access points in to the community Wi-Fi network.

20 Claims, 10 Drawing Sheets

(51) Int. Cl.
*H04W 84/18* (2009.01)
*H04W 24/02* (2009.01)
*H04W 84/02* (2009.01)
*H04W 88/00* (2009.01)

(56) References Cited

U.S. PATENT DOCUMENTS

| | | |
|---|---|---|
| 2006/0133332 A1 | 6/2006 | Achanta |
| 2007/0230422 A1 | 10/2007 | Suzuki et al. |
| 2007/0242657 A1 | 10/2007 | Waisman-Diamond |
| 2008/0069065 A1* | 3/2008 | Wu et al. ............... 370/340 |
| 2009/0124284 A1* | 5/2009 | Scherzer et al. ........ 455/552.1 |
| 2009/0252134 A1* | 10/2009 | Schlicht et al. ........ 370/338 |
| 2012/0008535 A1 | 1/2012 | Kuehnel |

OTHER PUBLICATIONS

"Cisco Service Provider Wi-Fi: A Platform for Business Innovation and Revenue Generation," Retrieved at <<http://www.cisco.com/en/US/solutions/collateral/ns341/ns524/ns673/solution_overview_c22-642482.html>>, Apr. 14, 2012, pp. 1-16.

Feng, Fang, "Mobile Movement Patterns and Applications in Wireless Networks," Retrieved at <<http://repository.lib.ncsu.edu/ir/bitstream/1840.16/5577/1/etd.pdf>>, in NC State Theses and Dissertations, Aug. 21, 2008, pp. 1-131.

Geier, Jim, "Implementing Multiple SSIDs," Retrieved at <<http://www.wi-fiplanetcom/tutorials/article.php/2196451>>, Apr. 24, 2003, pp. 1-3.

Geier, Eric, "Tweaking Your Wi-Fi Router or Access Points," Retrieved at <<http://www.windowsnetworking.com/articles-tutorials/wireless-networking/Tweaking-Your-Wi-Fi-Router-Access-Points.html>>, Sep. 20, 2012, pp. 1-4.

Jin, et al., "WiZi-Cloud: Application-transparent Dual ZigBee-WiFi Radios for Low Power Internet Access," Retrieved at <<http://www.cs.umb.edu/~shengbo/paper/infocom11.pdf>>, in Proceedings of IEEE INFOCOM, Apr. 10, 2011, pp. 1-9.

Duong, et al., "An Effective Approach for Mobility Prediction in Wireless Network based on Temporal Weighted Mobility Rule," Retrieved at <<http://www.ijcst.org/Volume3/Issue2/p6_3_2.pdf>>, in International Journal of Computer Science and Telecommunications, vol. 3, Issue 2, Feb. 2012, pp. 1-8.

"Configuring Multiple SSIDs," Retrieved at <<http://www.cisco.com/en/US/docs/wireless/access_point/12.3_7_JA/configuration/guide/s37ssid.html>>, Jun. 25, 2007, pp. 1-8.

"International Search Report & Written Opinion Issued in PCT Application No. PCT/US2014/063270", Mailed Date: Apr. 28, 2015, 19 pages.

"Response to the International Search Report (ISR) and Written Opinion for PCT Patent Application No. PCT/US2014/063270", Filed Date: Aug. 3, 2015, 17 pages.

"Written Opinion of the International Preliminary Examining Authority for PCT Patent Application No. PCT/US2014/063270", Mailed Date: Aug. 31, 2015, 6 pages.

"International Preliminary Report on Patentability Issued in PCT Application No. PCT/US2014/063270", Mailed Date: Jan. 25, 2016, 10 Pages.

\* cited by examiner

COMMUNITY WI-FI NETWORK JOINED ACCESS POINT CONFIGURATION

BACKGROUND

Local computing networks are ubiquitous in current society. Local networks are oftentimes prevalent in homes, businesses, schools, public areas, and so forth. When connected to a local network, a computing device can use and/or access various network resources made available on the local network, such as the Internet, network attached storage, printers, other computing devices on the local network, and the like.

Access to the Internet is typically provided to a local network by an Internet service provider (ISP). An account that allocates network bandwidth capacity can be procured from the ISP for the local network. Accordingly, when the computing device is connected to the local network, the network bandwidth capacity allocated to the account (e.g., procured for the local network) can be usable by the computing device, as well as other computing devices connected to the local network.

Local networks oftentimes have excess network bandwidth capacities allocated to respective accounts procured from ISP(s). Accordingly, it may be desirable to share portions of the network bandwidth capacities available to the local networks (e.g., with computing devices other than computing devices respectively included in the local networks). Yet, traditional approaches for sharing a portion of a network bandwidth capacity available to a local network with a differing device commonly involve connecting the differing device to the local network via a wired connection or providing credentials to enable the differing device to wirelessly connect to the local network (e.g., over a wireless fidelity (Wi-Fi) connection). However, in the various scenarios, the foregoing approaches may be impractical and time consuming. Moreover, the above approaches may pose security risks, particularly when allowing a device of an unknown guest to connect to the local network.

Further, as a computing device physically moves out of a coverage area of a first access point included in a first local network, the computing device may attempt to establish a communication session with a second access point included in a second local network. However, with various conventional approaches, there may be a period of time between the disconnection from the first access point and subsequent establishment of the connection with the second access point, which can lead to disruption in user experience when employing the computing device.

SUMMARY

Described herein are various technologies that pertain to configuring an access point in a local network for operation in a community Wi-Fi network. The community Wi-Fi network can include disparate access points in disparate local networks that share respective network bandwidth capacities with member computing devices of the community Wi-Fi network. A request to join the access point to the community Wi-Fi network can be transmitted from the access point to a community aggregation system. The community aggregation system can receive the request from the access point to join the community Wi-Fi network. Responsive to receipt of the request, the community aggregation system can transmit a firmware update to the access point. Accordingly, the access point can receive the firmware update from the community aggregation system responsive to the request. Further, the firmware update can be installed in memory of the access point. Responsive to installation of the firmware update, the access point can share network bandwidth capacity allocated to an account with the member computing devices of the community Wi-Fi network, where the network bandwidth capacity allocated to the account is accessible via the access point.

According to various embodiments, the access point can support dual Service Set Identifiers (SSIDs). A first SSID mapped to the local network (e.g., the local network that includes the access point) can remain configured upon installation of the firmware update. Moreover, the installation of the firmware update can configure a second SSID mapped to the community Wi-Fi network.

In accordance with various embodiments set forth herein, a handoff in the community Wi-Fi network can be transparent to a member computing device of the community Wi-Fi network. The community aggregation system can identify connected access points of the member computing device in the community Wi-Fi network, where the member computing device has unexpired communication sessions with the connected access points. The connected access points can be in differing local networks. The community aggregation system can further receive a data packet addressed to the member computing device. Moreover, the community aggregation system can select a first connected access point from the connected access points for delivery of the data packet, and can transmit the data packet to the first connected access point for delivery to the member computing device. The community aggregation system can also receive a second data packet addressed to the member computing device, where the first data packet and the second data packet form part of a data object. Further, the community aggregation system can select a second connected access point from the connected access points for delivery of the second data packet, and can transmit the second data packet to the second connected access point for delivery to the member computing device.

According to various embodiments, the member computing device of the community Wi-Fi network can establish a first communication session with a first access point in the community Wi-Fi network. Moreover, the member computing device can receive a first data packet that forms part of a data object from the first access point. A second communication session can further be established by the member computing device with a second access point in the community Wi-Fi network while the first communication session remains unexpired. Responsive to establishment of the second communication session, a second data packet that forms part of the in the data object can be received from the first access point, and a third data packet that forms part of the data object can be received from the second access point. Further, the first communication session with the first access point in the community Wi-Fi network can be terminated (e.g., subsequent to receipt of the second data packet and the third data packet). Responsive to termination of the first communication session, the member computing device can receive a fourth data packet that forms part of the data object from the second access point. Accordingly, the member computing device can transparently handoff from the first access point to the second access point in the community Wi-Fi network, where the first access point and the second access point are in differing local networks.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
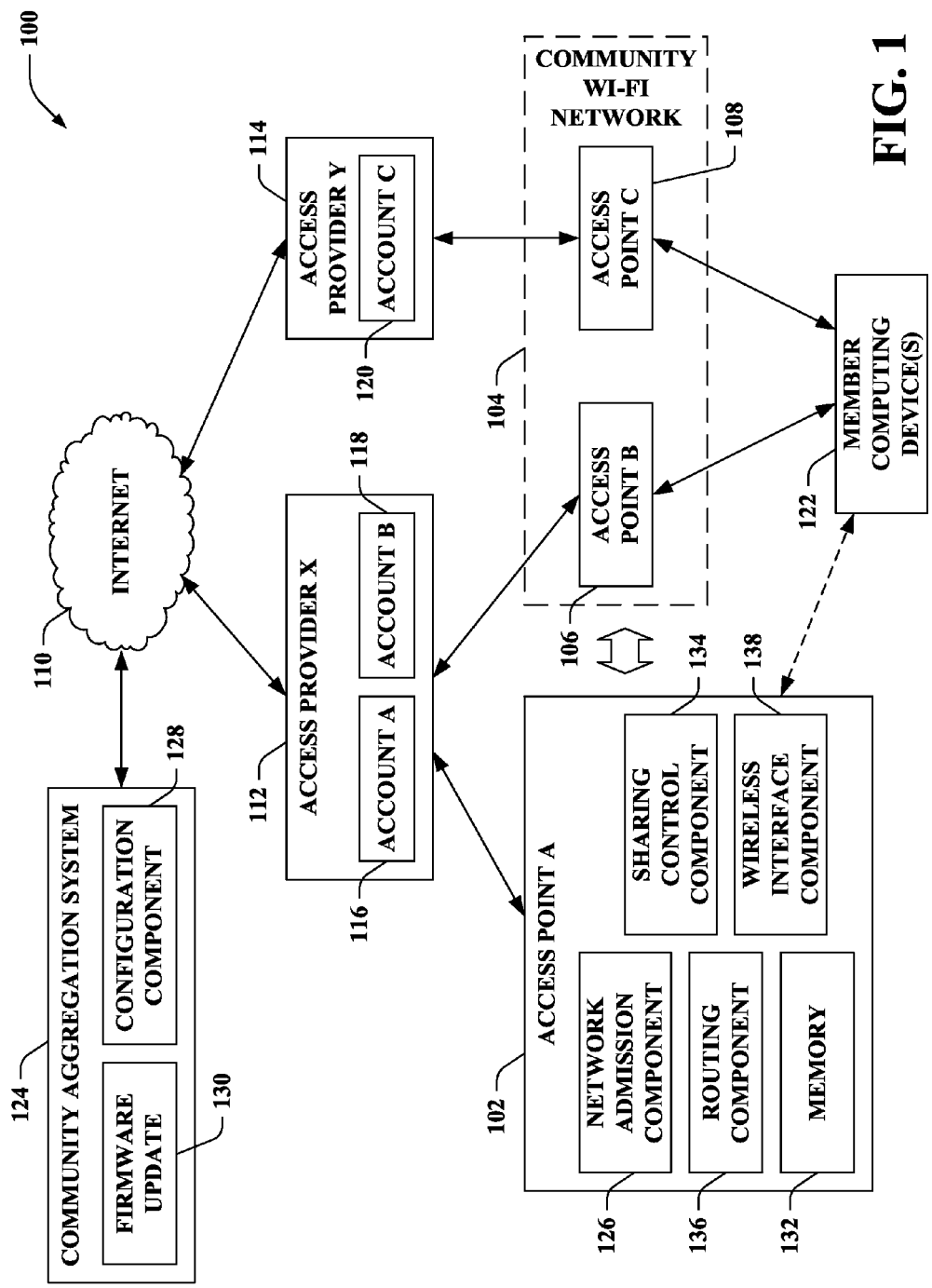
FIG. 1 illustrates a functional block diagram of an exemplary system of configuring an access point in a local network for joining a community Wi-Fi network.

Various technologies pertaining to configuring a community Wi-Fi network joined access point and/or routing data packets within the community Wi-Fi network are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 of configuring an access point A 102 in a local network (e.g., a local network A) for joining a community Wi-Fi network 104. The community Wi-Fi network 104 is a mesh of access points that have been joined to such network (e.g., via the access points being configured as described herein, responsive to the access points being opted-in to the community Wi-Fi network 104, etc.). Thus, the community Wi-Fi network 104 can include access points in disparate local networks.

More particularly, the community Wi-Fi network 104 can include an access point B 106 and an access point C 108. Although not shown, the access point B 106 can be in a local network B and the access point C 108 can be in a local network C. While many of the examples set forth herein describe the community Wi-Fi network 104 including the access point B 106 and the access point C 108 (collectively referred to herein as access points 106-108), it is contemplated that the community Wi-Fi network 104 can include substantially any number of access points substantially similar to the access points 106-108.

The local networks that include the access points (e.g., the access point A 102, the access points 106-108) can each have a respective account that allocates a network bandwidth capacity (e.g., to the Internet 110) procured from an access provider. In the depicted example, the local network A that includes the access point A 102 and the local network B that includes the access point B 106 can each have a respective account (an account A 116 and an account B 118) that allocates a network bandwidth capacity procured from an access provider X 112 (e.g., an ISP, a mobile network, etc.). Further following the depicted example, the local network C that includes the access point C 108 can have an account (an account C 120) that allocates a network bandwidth capacity procured from an access provider Y 114 (e.g., an ISP, a mobile network, etc.). It is to be appreciated that access points joined (or joinable) to the community Wi-Fi network 104 can be associated with accounts from any type and/or number of access providers, and the claimed subject matter is not limited to the illustrated example.

The access points 106-108 in the community Wi-Fi network 104 can share respective network bandwidth capacities (e.g., for the respective local networks) with one or more member computing devices 122 of the community Wi-Fi network 104. A member computing device is a computing device that can consume network bandwidth capacity shared by an access point in the community Wi-Fi network 104 (e.g., the access points 106-108, the access point A 102 upon being joined to the community Wi-Fi network 104, etc.). It is contemplated that a member computing device can be substantially any type of computing device. For instance, the member computing device can be a mobile device, such as a mobile phone (e.g., smartphone), a tablet computer, a handheld computer, a laptop computer, a wearable computer, a personal digital assistant (PDA), a portable gaming device, an in-vehicle communications and infotainment system, or the like. According to other examples, the member computing device can be a personal computer, a gaming console, and so forth. However, it is to be appreciated that substantially any other type of computing device is intended to fall within the scope of the hereto appended claims.

The system 100 further includes a community aggregation system 124 that can control membership to the community Wi-Fi network 104, route data packets to and/or from access points included in the community Wi-Fi network 104, and so forth.

As described in greater detail herein, the access point A 102 can be joined to the community Wi-Fi network 104. For instance, the access point A 102 can receive an opt-in signal indicating that the access point A 102 desirably be added to the community Wi-Fi network 104. The access point A 102 can be joined to the community Wi-Fi network 104 to enable at least a portion of the network bandwidth capacity allocated to the account A 116 accessible via the access point A 102 to be shared with the member computing devices 122.

The access point A 102 can include a network admission component 126 that transmits a request to join the access point A 102 to the community Wi-Fi network 104. The request can be transmitted by the network admission component 126 to the community aggregation system 124. According to an example, the request can be transmitted by the network admission component 126 responsive to receiving an opt-in signal indicating that the access point A 102 desirably be added to the community Wi-Fi network. Pursuant to an example, the opt-in signal can be received by the network admission component 126 responsive to a user selection. Following this example, an owner (or other authorized user) of the access point A 102 can elect to share excess network bandwidth capacity allocated to the account A 116 procured from the access provider X 112, where the excess network bandwidth capacity can be shared with the member computing devices 122 in the community Wi-Fi network 104. According to another example, the opt-in signal can be received by the network admission component 126 during initial setup of the access point A 102 (e.g., as part of an out-of-the-box experience of the access point A 102).

The community aggregation system 124 can include a configuration component 128 that can receive the request from the access point A 102 to join the community Wi-Fi network 104. Moreover, the configuration component 128 can transmit a firmware update 130 to the access point A 102 responsive to receipt of the request.

According to an example, the network admission component 126 can transmit an identifier indicating a type of the access point A 102. For instance, the identifier can be transmitted with the request to join the access point A 102 to the community Wi-Fi network 104. Based upon the identifier indicating the type of the access point A 102, the configuration component 128 can select a corresponding firmware update 130 for the given type of access point and transmit the selected firmware update 130 to the access point A 102.

The network admission component 126 of the access point A 102 can receive the firmware update 130 from the community aggregation system 124 responsive to the request. The network admission component 126 can install the firmware update 130 in memory 132 of the access point A 102. Responsive to installation of the firmware update 130 in the memory 132, the network bandwidth capacity allocated to the account A 116 can be shared with the member computing devices 122 of the community Wi-Fi network 104.

The network bandwidth capacity allocated to the account A 116 (or a portion thereof) accessible via the access point A 102 can be shared by a sharing control component 134 of the access point A 102. The sharing control component 134 can control whether the network bandwidth capacity allocated to the account A 116 is shared with the member computing devices 122 of the community Wi-Fi network 104, an amount of the network bandwidth capacity allocated to the account A 116 to be shared for consumption by the member computing devices 122, types of applications for which the network bandwidth capacity can be employed, and so forth. According to an example, the sharing control component 134 can cap an amount of the network bandwidth capacity allocated to the account A 116 that can be consumed by the member computing devices 122.

Moreover, the access point A 102 can include a routing component 136 that can separate data traffic for the local network A that includes the access point A 102 from data traffic in the community Wi-Fi network 104 when the access point A 102 is joined to the community Wi-Fi network 104. Thus, the community Wi-Fi network 104 can be virtually separated from the local network A associated with the access point A 102. Accordingly, the local network A associated with the access point A 102 can be inaccessible by the member computing devices 122 unless explicitly granted access to such local network, while the community Wi-Fi network 104 can be accessible via the access point A 102.

The access point A 102 can further include a wireless interface component 138 that can communicate with the member computing devices 122 over a Wi-Fi connection. The wireless interface component 138 can communicate with the member computing devices 122 via the Wi-Fi connection when the access point A 102 is added to the community Wi-Fi network 104 (e.g., upon installation of the firmware update in the memory 132 of the access point A 102 by the network admission component 126).

Figure 2:
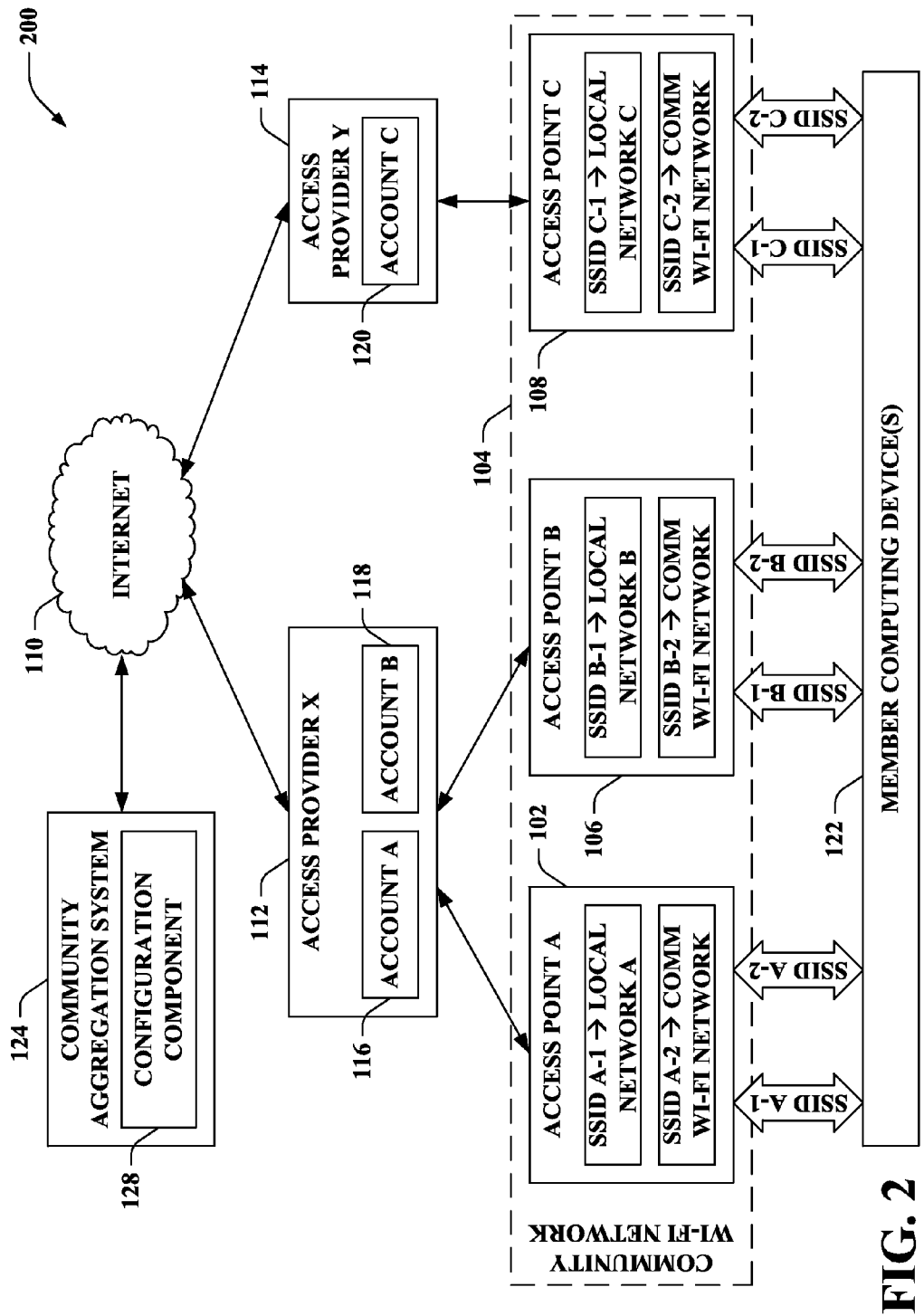
FIG. 2 illustrates a functional block diagram of an exemplary system that includes access points that support multiple SSIDs, where the access points are included in the community Wi-Fi network.

Turning to FIG. 2, illustrated is a system 200 that includes access points that support multiple SSIDs, where the access points are included in the community Wi-Fi network 104. In the example set forth in FIG. 2, the access point A 102 has been added to the community Wi-Fi network 104 (e.g., the community Wi-Fi network 104 includes the access point A 102, the access point B 106, the access point C 108, etc.). While many of the examples set forth herein describe the access points included in the community Wi-Fi network 104 being configured with two SSIDs, it is to be appreciated that one or more of the access points can be configured with more than two SSIDs.

A firmware update installed in memory of an access point, responsive to the access point sending a request to the configuration component 128 to join the community Wi-Fi network 104, can configure an SSID mapped to the community Wi-Fi network 104. For example, as described in FIG. 1, the access point A 102 can install the firmware update 130 in the memory 132 of the access point A 102. Following this example, a first SSID (SSID A-1) mapped to the local network A that includes the access point A 102 can remain configured upon installation of the firmware update, while the installation of the firmware update can configure a second SSID (SSID A-2) mapped to the community Wi-Fi network 104. Thus, the firmware update can configure the access point A 102 for dual SSIDs. For instance, when configured, a guest network can be mapped to the community Wi-Fi network 104; yet, the claimed subject matter is not so limited.

Access points included in the community Wi-Fi network 104 can each have a first SSID mapped to a respective local network and a second SSID mapped to the community Wi-Fi network 104. More particularly, the access point A 102 can have a first SSID (SSID A-1) mapped to the local network A that includes the access point A 102 and a second SSID (SSID A-2) mapped to the community Wi-Fi network 104. Similarly, the access point B 106 can have a first SSID (SSID B-1) mapped to the local network B that includes the access point B 106 and a second SSID (SSID B-2) mapped to the community Wi-Fi network 104. Likewise, the access point C 108 can have a first SSID (SSID C-1) mapped to the local network C that includes the access point C 108 and a second SSID (SSID C-2) mapped to the community Wi-Fi network 104.

The SSID A-2, the SSID B-2, and the SSID C-2 are dedicated to providing a backhaul to the community Wi-Fi network 104. According to an example, two or more of the access points (from differing local networks) included in the community Wi-Fi network 104 can be configured to use the same SSID mapped to the community Wi-Fi network 104. By way of illustration, the SSID A-2 can be the same as the SSID B-2. Additionally or alternatively, two or more of the access points (from differing local networks) included in the community Wi-Fi network 104 can be configured to use differing SSIDs, each of which are mapped to the community Wi-Fi network 104. Thus, according to an illustration, the SSID A-2 can differ from the SSID C-2. In accordance with the example where the SSIDs mapped to the community Wi-Fi network 104 differ for access points in differing local networks, the member computing devices 122 can determine that such SSIDs each correspond to the community Wi-Fi network 104; however, the claimed subject matter is not so limited.

By way of illustration, the access point A 102 can receive a data packet that includes the SSID A-2 mapped the community Wi-Fi network 104 from one of the member computing devices 122 of the community Wi-Fi network 104. Based upon the SSID A-2, the access point A 102 (e.g., the routing component 136) can route the data packet to the community aggregation system 124 utilizing the network bandwidth capacity allocated to the account A 116. Moreover, the data packet can be virtually separated from received data packets that include the SSID A-1. Similarly, the access point A 102 can receive a data packet from the community aggregation system 124 addressed to one of the member computing devices 122 of the community Wi-Fi network 104. The access point A 102, for example, can insert the SSID A-2 in the data packet, which can thereafter be transmitted to the member computing device 122 (e.g., via the Wi-Fi connection). Again, such data packet can be virtually separated from data packets addressed to a computing device in the local network A that includes the access point A 102.

Figure 3:
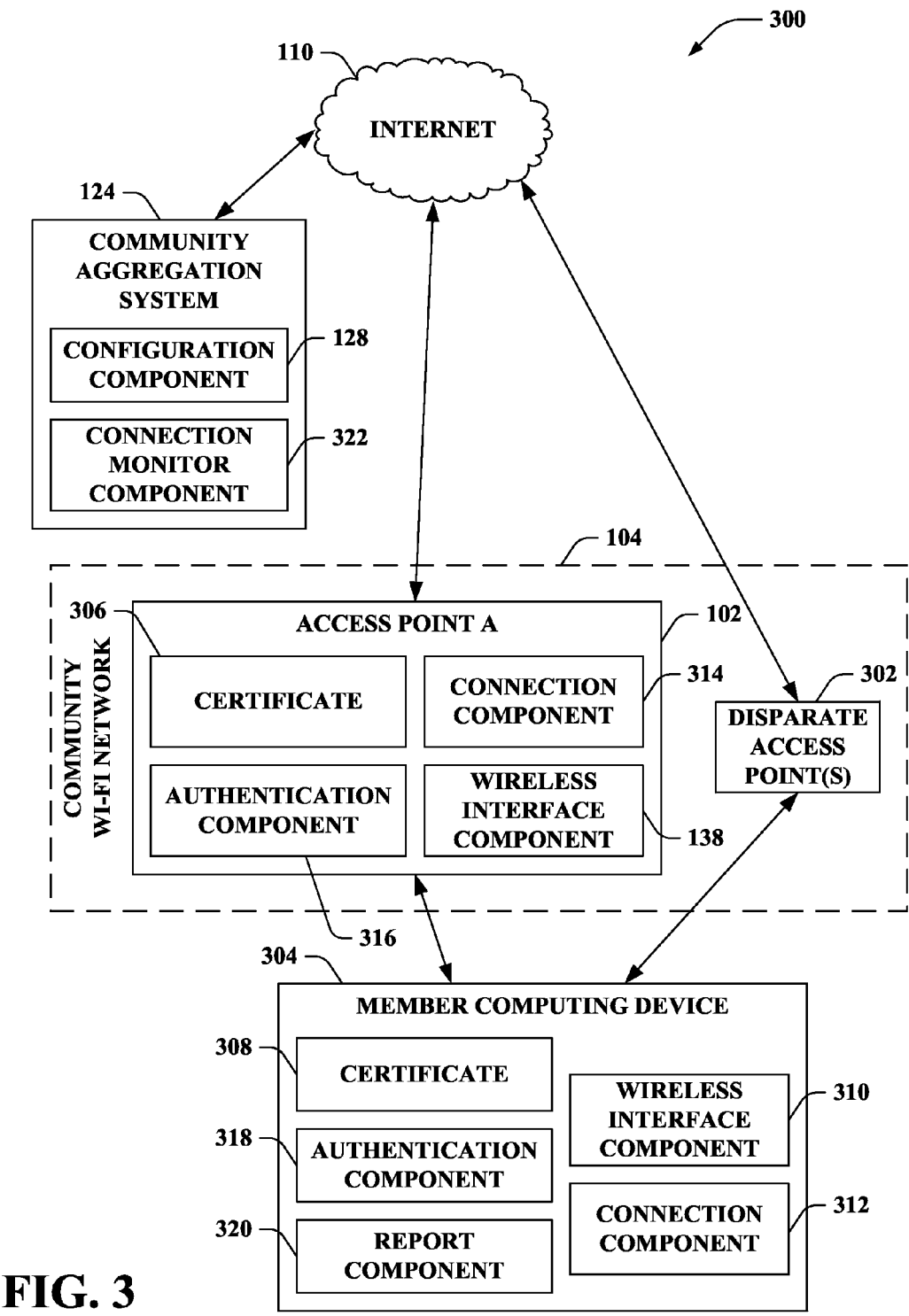
FIG. 3 illustrates a functional block diagram of an exemplary system that authenticates access points and member computing devices when establishing communication sessions in the community Wi-Fi network.

Referring now to FIG. 3, illustrated is a system 300 that authenticates access points and member computing devices when establishing communication sessions in the community Wi-Fi network 104. Again, the community Wi-Fi network 104 can include the access point A 102 and disparate access points 302 (e.g., the access points 106-108). Moreover, the system 300 includes a member computing device 304 of the community Wi-Fi network 104. While not shown, it is to be appreciated that the system 300 can include substantially any number of disparate member computing devices, which can be substantially similar to the member computing device 304.

Moreover, the community aggregation system 124 includes the configuration component 128, which can transmit, to the access point A 102, a certificate 306 for authenticating the access point A 102 in the community Wi-Fi network 104. Similarly, the configuration component 128 can transmit, to the disparate access points 302, respective certificates for respectively authenticating such disparate access points 302 in the community Wi-Fi network 104. Moreover, the configuration component 128 can transmit, to the member computing device 304, a certificate 308 for authenticating the member computing device 304 in the community Wi-Fi network 104. The configuration component 128 can likewise transmit certificates to the disparate member computing devices of the community Wi-Fi network 104. According to an example, the configuration component 128 can provide a certificate to an access point or a member computing device responsive to such access point or member computing device joining the community Wi-Fi network 104.

Thus, the access point A 102 can receive the certificate 306 for authenticating the access point A 102 in the community Wi-Fi network 104 from the community aggregation system 124. Moreover, the member computing device 304 can receive the certificate 308 for authenticating the member computing device 304 in the community Wi-Fi network 104 from the community aggregation system 124.

The member computing device 304 can include a wireless interface component 310 that can communicate with an access point (or access points) over a Wi-Fi connection. The member computing device 304 further includes a connection component 312 that can form and maintain a communication session with an access point in the community Wi-Fi network 104. It is contemplated that the connection component 312 can concurrently maintain communication sessions (unexpired communication sessions) with more than one access point from the community Wi-Fi network 104. Moreover, the connection component 312 can terminate a communication session with an access point in the community Wi-Fi network 104.

Moreover, the access point A 102 can include a connection component 314 that can form, maintain, and/or terminate a communication session with a member computing device of the community Wi-Fi network 104. The connection component 314 can concurrently maintain communication sessions (unexpired communication sessions) with substantially any number of member computing devices of the community Wi-Fi network 104.

According to an example, the connection component 312 of the member computing device 304 and the connection component 314 of the access point A 102 can initialize a communication session between the member computing device 304 and the access point A 102. Responsive to initializing the communication session between the member computing device 304 and the access point A 102, the connection component 314 of the access point A 102 can transmit the certificate 306 for authenticating the access point A 102 in the community Wi-Fi network 104 to the member computing device 304. Additionally or alternatively, responsive to initializing the communication session between the member computing device 304 and the access point A 102, the connection component 314 of the member computing device 304 can transmit the certificate 308 for authenticating the member computing device 304 in the community Wi-Fi network 104 to the access point A 102.

The access point A 102 can further include an authentication component 316. Following the above example where the communication session between the member computing device 304 and the access point A 102 is initialized, the authentication component 316 can authenticate the member computing device 304. More particularly, the access point A 102 can receive the certificate 308 from the member computing device 304. The authentication component 316 can authenticate the member computing device 304 utilizing the certificate 308 received from the member computing device 304. Responsive to the authentication by the authentication component 316, the access point A 102 can share the network bandwidth capacity allocated to the account with the member computing device 304 in the communication session.

The member computing device 304 can further include an authentication component 318. Again reference is made to the foregoing example where the communication session between the member computing device 304 and the access point A 102 is initialized. The member computing device 304 can receive the certificate 306 from the access point A 102.

Moreover, the authentication component 318 can authenticate the access point A 102 utilizing the certificate 306 received from the access point A 102. Responsive to the authentication by the authentication component 318, the member computing device 304 can send and/or receive data traffic as part of the communication session.

By way of example, mutual authentication can be employed in the system 300 (e.g., the authentication component 316 of the access point A 102 can authenticate the member computing device 304 and the authentication component 318 of the member computing device 304 can authenticate the access point A 102) utilizing certificates distributed by the community aggregation system 124. Pursuant to other examples, certificates can be employed to authenticate access points (without being employed to authenticate member computing devices) or to authenticate member computing devices (without being employed to authenticate access points). Moreover, it is contemplated that other types of credentials (in addition to or instead of the certificates) can be utilized in the system 300 for authentication.

Moreover, the member computing device 304 can establish substantially any number of concurrent communication sessions with access points included in the community Wi-Fi network 104. For instance, the member computing device 304 can establish a first communication session with the access point A 102 and a second communication session with one of the disparate access points 302 in the community Wi-Fi network 104. Such communication sessions can both be unexpired during a given period of time. The member computing device 304 can further include a report component 320 that transmits connection data indicating access points with which the member computing device 304 has unexpired communication sessions established. Such connection data can be transmitted to the community aggregation system 124 via one or more of the access points in the community Wi-Fi network 104; however, claimed subject matter is not so limited.

The community aggregation system 124 can further include a connection monitor component 322 that identifies access points (included in the community Wi-Fi network 104) with which the member computing device 304 has unexpired communication sessions established (referred to herein as connected access points). For instance, the connection monitor component 322 can receive the connection data indicating access points with which the member computing device 304 has unexpired communication sessions established. However, it is to be appreciated that the connection monitor component 322 can additionally or alternatively identify the connected access points of the member computing device 304 in substantially any other manner.

It is to be appreciated that the member computing device 304 can establish more than one concurrent, unexpired communication session in various manners. For example, the wireless interface component 310 can include more than one wireless radio. Following this example, each wireless radio can establish a respective communication session with a corresponding connected access point.

By way of another example, the wireless interface component 310 can include a single radio. Pursuant to this example, when more than one concurrent, unexpired communication session with more than one connected access point in the community Wi-Fi network 104 is established, the member computing device 304 can communicate with a first connected access point during a first time slice (while indicating to the remaining connected access point(s) that the member computing device 304 is in a sleep state). During a next time slice, the member computing device 304 can communicate with a second connected access point (while indicating to the remaining connected access point(s) including the first connected access point that the member computing device 304 is in the sleep state). For foregoing can be repeated for any remaining connected access points.

Figure 4:
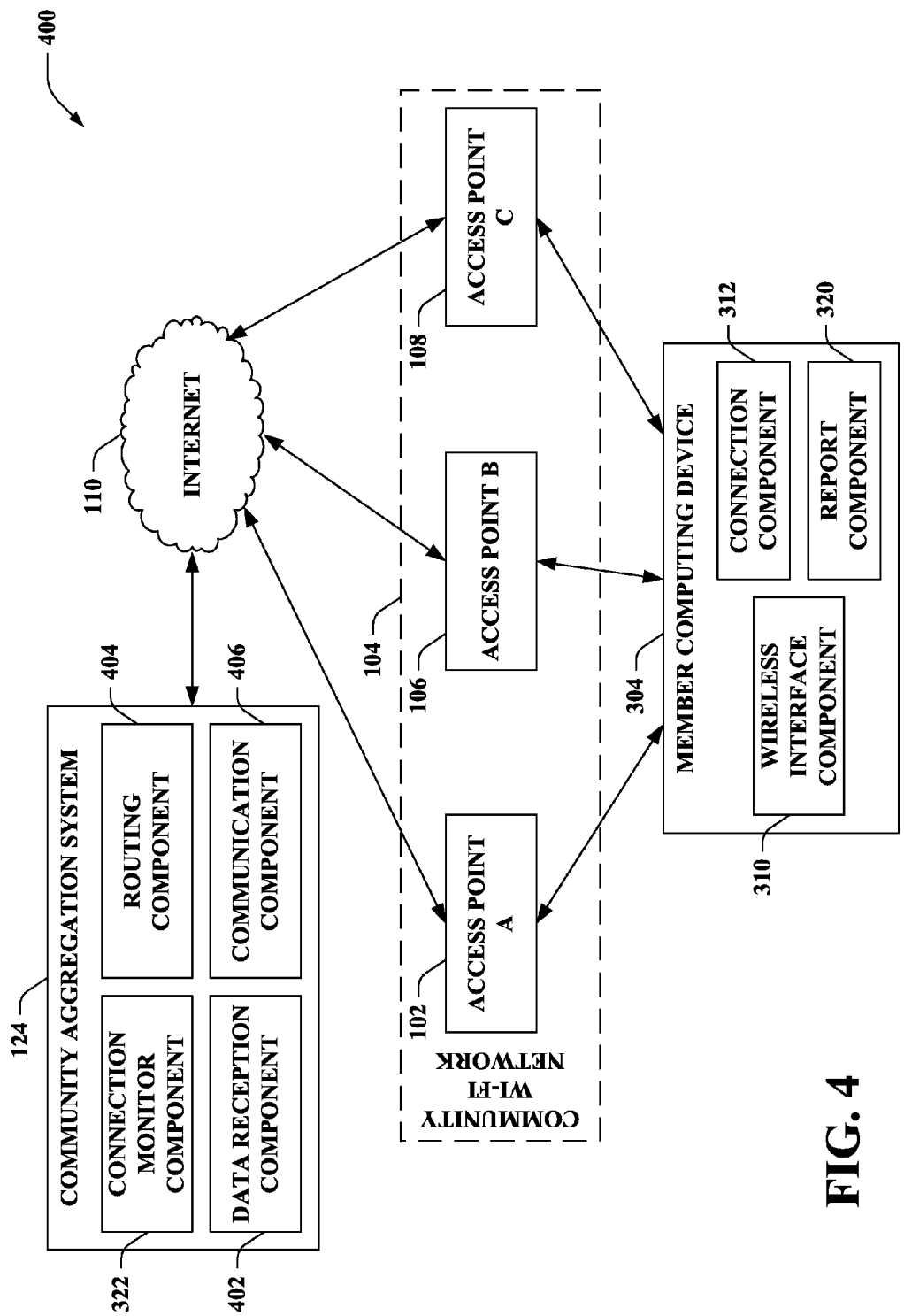
FIG. 4 illustrates a functional block diagram of an exemplary system that enables handoff of data traffic transmitted to and/or received from the member computing device in the community Wi-Fi network.

With reference to FIG. 4, illustrated is a system 400 that enables handoff of data traffic transmitted to and/or received from the member computing device 304 in the community Wi-Fi network 104. The data traffic can be handed off between access points in the community Wi-Fi network 104. Again, the example set forth in FIG. 4 shows the community Wi-Fi network 104 including the access point A 102, the access point B 106, and the access point C 108; yet, it is contemplated that the community Wi-Fi network 104 can include substantially any number of access points.

In the system 400, the community aggregation system 124 can include the connection monitor component 322, which can identify connected access points of the member computing device 304 in the community Wi-Fi network 104 (e.g., the connected access points can be a subset of the access points in the community Wi-Fi network 104). As noted above, the report component 320 of the member computing device 304 can transmit the connection data indicating the connected access points with which the member computing device 304 has unexpired communication sessions established. Such connection data can be received by the connection monitor component 322 (e.g. via one or more of the connected access points) and employed to identify the connected access points of the member computing device 304 in the community Wi-Fi network 104.

Moreover, the community aggregation system 124 can include a data reception component 402 that can receive a data packet addressed to the member computing device 304. The data packet can form part of a data object. Examples of the data object include a media session, a file, a webpage, or the like. According to various illustrations, the data object can include data packets for a voice call, a video conference, a video, an image, a video stream, an audio stream, and so forth. Moreover, the data reception component 402 can receive the data packet from substantially any source.

The community aggregation system 124 can further include a routing component 404 and a communication component 406. The routing component 404 can select a first connected access point from the connected access points for delivery of the data packet. For instance, the routing component 404 can translate an Internet Protocol (IP) address of the data packet, causing the data packet to be forwarded to the first connected access point. Moreover, the communication component 406 can transmit the data packet to the first connected access point for delivery to the member computing device 304. By way of example, for a data packet addressed to the member computing device 304 received by the data reception component 402, the routing component can select the access point A 102 for delivery of the data packet and the communication component 406 can transmit the data packet to the access point A 102. Thus, the access point A 102 can receive the data packet, and can further transmit the data packet to the member computing device 304.

The routing component 404 can select a connected access point for delivery of a data packet to the member computing device 304 based upon various factors. By way of example, the routing component 404 can select the connected access point for delivery of a data packet based at least in part upon costs of the respective network bandwidth capacities of the connected access points of the member computing device 304. Additionally or alternatively, the routing component 404 can select the connected access point for delivery of the data packet as a function of connection quality of the respective network bandwidth capacities shared by the connected access points. Other examples of factors include load balancing, cryptographic security based upon spatial redundancy, data replication, and so forth.

For instance, the routing component 404 can duplicate delivery of a data packet addressed to the member computing device 304. Thus, the routing component 404 can select a second connected access point from the connected access points for duplicate delivery of the data packet. Again, by way of example, a data packet addressed to the member computing device 304 can be received by the data reception component 402. The routing component 404 can select the access point A 102 and the access point B 106 for delivery of the data packet. Following this example, the communication component 406 can transmit the data packet to the access point A 102 and the access point B 106. Accordingly, the access point A 102 and the access point B 106 can both transmit the data packet to the member computing device 304. It is contemplated that the routing component 404 can duplicate delivery of a subset of data packets from a data object; yet, the claimed subject matter is not so limited. Parallel delivery of a data packet can facilitate ensuring successful delivery of the data packet to the member computing device 304.

Moreover, the member computing device 304 can similarly send a data packet in parallel to the community aggregation system 124 (e.g., to the data reception component 402) via more than one of the access points of the community Wi-Fi network 104. For instance, the member computing device 304 can transmit a data packet to the access point A 102 and the access point B 106 for delivery to the community aggregation system 124 (e.g., the data reception component 402).

Further, data packets that form part of a data object can be routed by the routing component 404 to differing connected access points while the member computing device 304 has unexpired communication sessions established with the differing connected access points. Pursuant to an example, the data reception component 402 can receive a first data packet and a second data packet addressed to the member computing device 304, where the first data packet and the second data packet form part of the data object. Following this example, the routing component 404 can select a first connected access point (from the connected access points) (e.g., the access point A 102) for delivery of the first data packet and a second connected access point (from the connected access points) (e.g., the access point B 106) for delivery of the second data packet. Further, the communication component 406 can transmit the first data packet to the first connected access point and the second data packet to the second connected access point for respective delivery to the member computing device 304.

The data packets that form part of the data object can be routed by the routing component 404 to differing connected access points to facilitate handoff between access points, for example. Additionally or alternatively, the data packets that form part of the data object can be routed by the routing component 404 to differing connected access points to balance data traffic across access points. For instance, the routing component 404 can perform load balancing of data traffic with the member computing device 304 across connected access points. It is to be appreciated that the data traffic with the member computing device 304 can be symmetrically distributed across connected access points, asymmetrically distributed across connected access points, etc.

Figure 5:
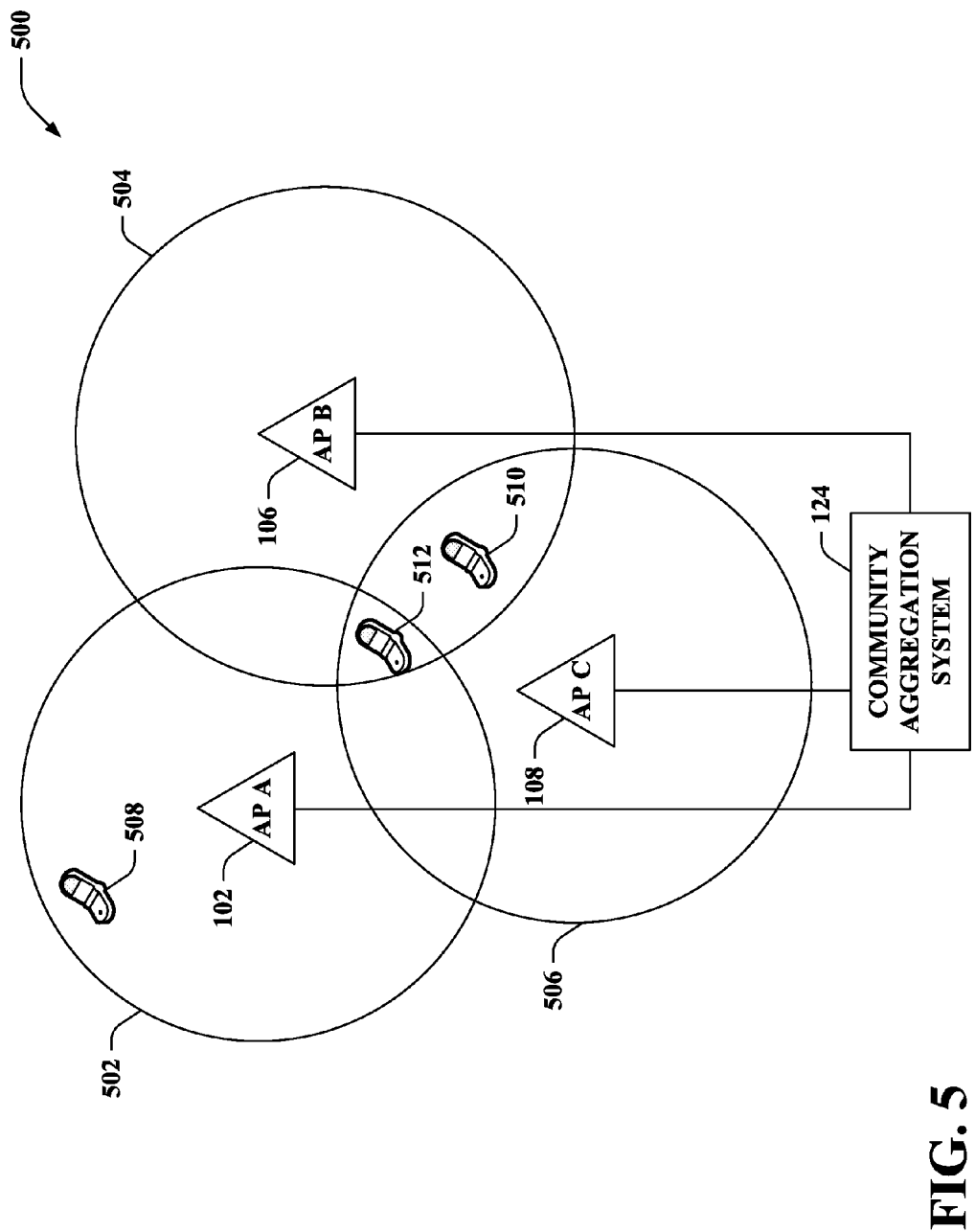
FIG. 5 illustrates a diagram of an exemplary system that includes access points that have been joined to a community Wi-Fi network.

Turning to FIG. 5, illustrated is a system 500 that includes access points that have been joined to a community Wi-Fi network (e.g., the community Wi-Fi network 104). The system 500 includes the access point A 102, the access point B 106, and the access point C 108, each of which can communicate with the community aggregation system 124 (e.g., via respective network bandwidth capacities). As depicted in FIG. 5, the access point A 102 has a coverage area 502, the access point B 106 has a coverage area 504, and the access point C 108 has a coverage area 506 (collectively referred to as coverage areas 502-506). While shown as being circular, it is to be appreciated that one or more of the coverage areas 502-506 can be substantially any other shape and/or size.

The coverage area 502 is a coverage area of the local network A that includes the access point A 102. The coverage area 504 is a coverage area of the local network B that includes the access point B 106. The coverage area 506 is a coverage area of the local network C that includes the access point C 108. Moreover, since the access point A 102, the access point B 106, and the access point C 108 have been added to the community Wi-Fi network, a coverage area of the community Wi-Fi network is a union of the coverage areas 502-506.

The system 500 further includes member computing devices geographically positioned within the coverage areas 502-506 of the access points. As shown in FIG. 5, a member computing device 508 is geographically located within the coverage area 502. Accordingly, the member computing device 508 can establish a communication session with the access point A 102. Further, a member computing device 510 is geographically located within the coverage area 504 of the access point B 106 and within the coverage area 506 of the access point C 108. Thus, according to an example, the member computing device 510 can concurrently maintain established communication sessions with both the access point B 106 and the access point C 108. Moreover, the system 500 includes a member computing device 512, which is geographically positioned within the coverage area 502, the coverage area 504, and the coverage area 506. Accordingly, it is contemplated that the member computing device 512 can concurrently maintain established communication sessions with one or more of the access points (e.g., the access point A 102, the access point B 106, and/or the access point C 108).

Further, the community aggregation system 124 (e.g., the routing component 404) can handoff a member computing device between the access points of the community Wi-Fi network (e.g., as the member computing device moves within the coverage areas 502-506); such handoff can be transparent to the member computing device. Handoff between access points of the community Wi-Fi network is described in the below example.

According to an example, a member computing device can be positioned at a geographic location of the member computing device 508. Accordingly, the member computing device can establish a first communication session with the access point A 102 in the community Wi-Fi network. Thus, the member computing device can receive, from the access point A 102, a first data packet that forms part of a data object. Thereafter, the member computing device can move to a geographic location of the member computing device 512. Accordingly, the member computing device can establish a second communication session with the access point B 106 in the community Wi-Fi network, while the first communication session with the access point A 102 remains unexpired. Responsive to establishment of the second communication session, the member computing device can receive, from the access point A 102, a second data packet that forms part of the data object. Additionally, the member computing device can receive, from the access point B 106, a third data packet that forms part of the data object responsive to establishment of the second communication session. Thereafter, the member computing device can move to a geographic location of the member computing device 510. Accordingly, the first communication session with the access point A 102 in the community Wi-Fi network can be terminated. Responsive to termination of the first communication session, the member computing device can receive, from the access point B 106, a fourth data packet that forms part of the data object.

As described in the foregoing example, the handoff between access points in the community Wi-Fi network can be transparent to the member computing device. Moreover, the community aggregation system 124 can distribute data packets to respective access points based on predicted movement of the member computing device (e.g., when traveling via car, train, walking, etc.) using a moving proxy; yet, the claimed subject matter is not so limited.

Moreover, pursuant to an illustration, it is contemplated that the first data packet, the second data packet, the third data packet, and the fourth data packet in the foregoing example can each include a common SSID mapped to the community Wi-Fi network; yet, the claimed subject matter is not so limited.

According to an illustration, a member computing device can be positioned at a geographic location of the member computing device 512, and the member computing device can have concurrent, unexpired communication sessions with the access point A 102, the access point B 106, and the access point C 108. While at such geographic location, the member computing device 512 may be exchanging data packets with the access point A 102; accordingly, the member computing device 512 can be pre-connected to the access point B 106 and the access point C 108. If the member computing device moves out of the coverage area 502 of the access point A 502, then the data packets can instead be routed through one or more of the pre-connected access points in the community Wi-Fi network (e.g., the access point B 106 and/or the access point C 108).

Figure 6:
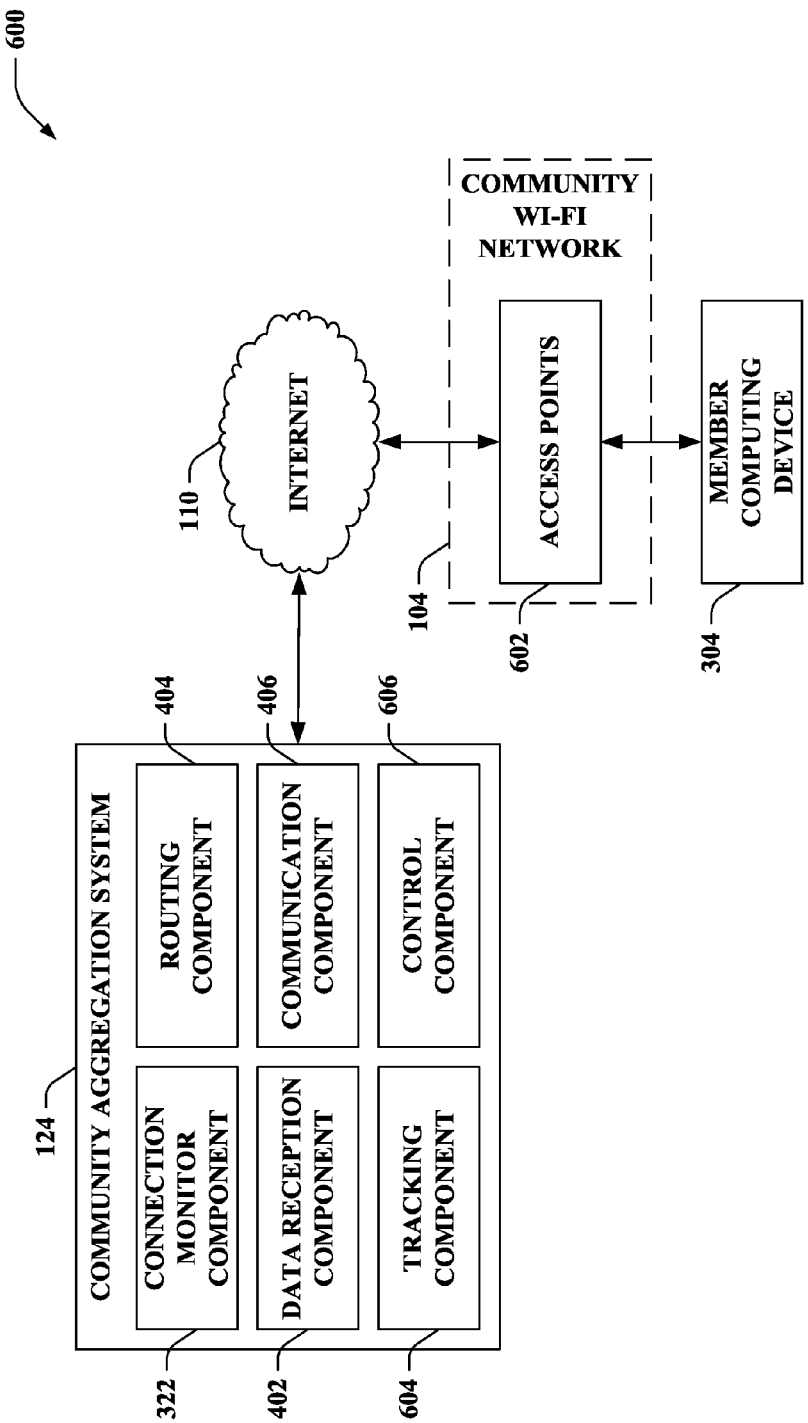
FIG. 6 illustrates a functional block diagram of an exemplary system that distributes data packets to respective access points in the community Wi-Fi network based on predicted movement of the member computing device.

Turning to FIG. 6, illustrated is a system 600 that distributes data packets to respective access points 602 (e.g., the access point A 102, the access points 106-108, the disparate access point(s) 302, etc.) in the community Wi-Fi network 104 based on predicted movement of the member computing device 304. In the system 600, the community aggregation system 124 includes a tracking component 604 that predicts motion of the member computing device 304 over time. The tracking component 604 can determine an anticipated geographic location of the member computing device 304 at a time of delivery of a data packet based upon the predicted motion. Thus, the data reception component 402 can receive the data packet addressed to the member computing device 304. Further, the routing component 404 can select a given connected access point for delivery of the data packet based upon the anticipated geographic location of the member computing device 304, and the communication component 406 can transmit the data packet to the given connected access point for delivery to the member computing device 304.

By way of illustration, the member computing device 304 can be moving through a geographic area. The data reception component 402 can receive a set of data packets (e.g., corresponding to a webpage, video, image, etc.) addressed to the member computing device 304. Further, the tracking component 604 can predict the motion of the member computing device 304 over time. Based upon the prediction motion, the tracking component 604 can determine that the member computing device 304 is predicted to be within the coverage area of a first access point (e.g., one of the access points 602) during a first time period and within the coverage area of a second access point (e.g., another one of the access points 602) during a second time period. Further, the tracking component 604 can determine a first subset of the data packets that can be sent to the member computing device 304 during the first time period (e.g., from the first access point, utilizing network bandwidth capacity shared by the first access point, etc.) and a second subset of the data packets that can be sent to the member computing device 304 during the second time period (e.g., from the second access point, utilizing network bandwidth capacity shared by the second access point, etc.). Hence, the routing component 404 and the communication component 406 can send the first subset of the data packets to the first access point and the second subset of the data packets to the second access point. The first subset of the data packets can be buffered at the first access point and the second subset of the data packets can be buffered at the second access point. Accordingly, the first subset of the data packets can be transmitted by the first access point to the member computing device 304 when the member computing device 304 is within the coverage area of the first access point (e.g. during the first time period), and the second subset of the data packets can be transmitted by the second access point to the member computing device 304 when the member computing device 304 is within the coverage area of the second access point (e.g., during the second time period). Thus, the set of data packets can be routed and/or distributed within the system 600 based upon latency, which can be a function of the predicted motion (e.g., speed) of the member computing device 304.

The community aggregation system 124 can further include a control component 606 that selectively manages compression of the data object that includes the data packet. Compression can be selectively managed by the control component 606 as a function of the predicted motion of the member computing device 304 over time. For instance, if the member computing device 304 is predicted by the tracking component 604 to be moving at a high rate of speed (e.g., having communication sessions with connected access points for relatively limited durations of time), then the control component 606 can increase a degree of compression of the data object as compared to if the member computing device 304 is moving at a low rate of speed (or is stationary). Thus, the control component 606 can control compression parameters (e.g., type of codec used for a voice call, degree of compression of an image, etc.).

Figure 7:
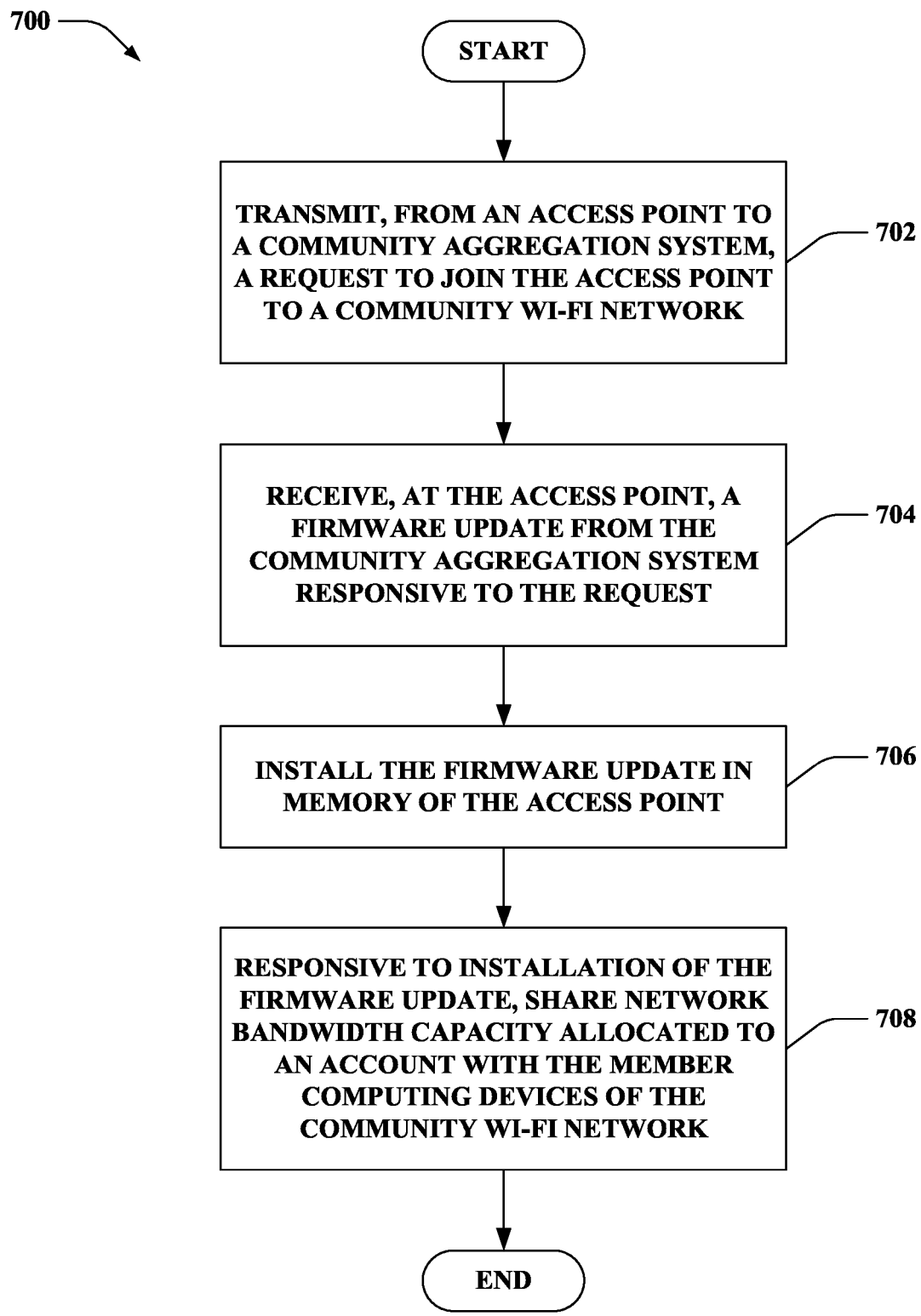
FIG. 7 is a flow diagram that illustrates an exemplary methodology of configuring an access point in the local network.
Figure 8:
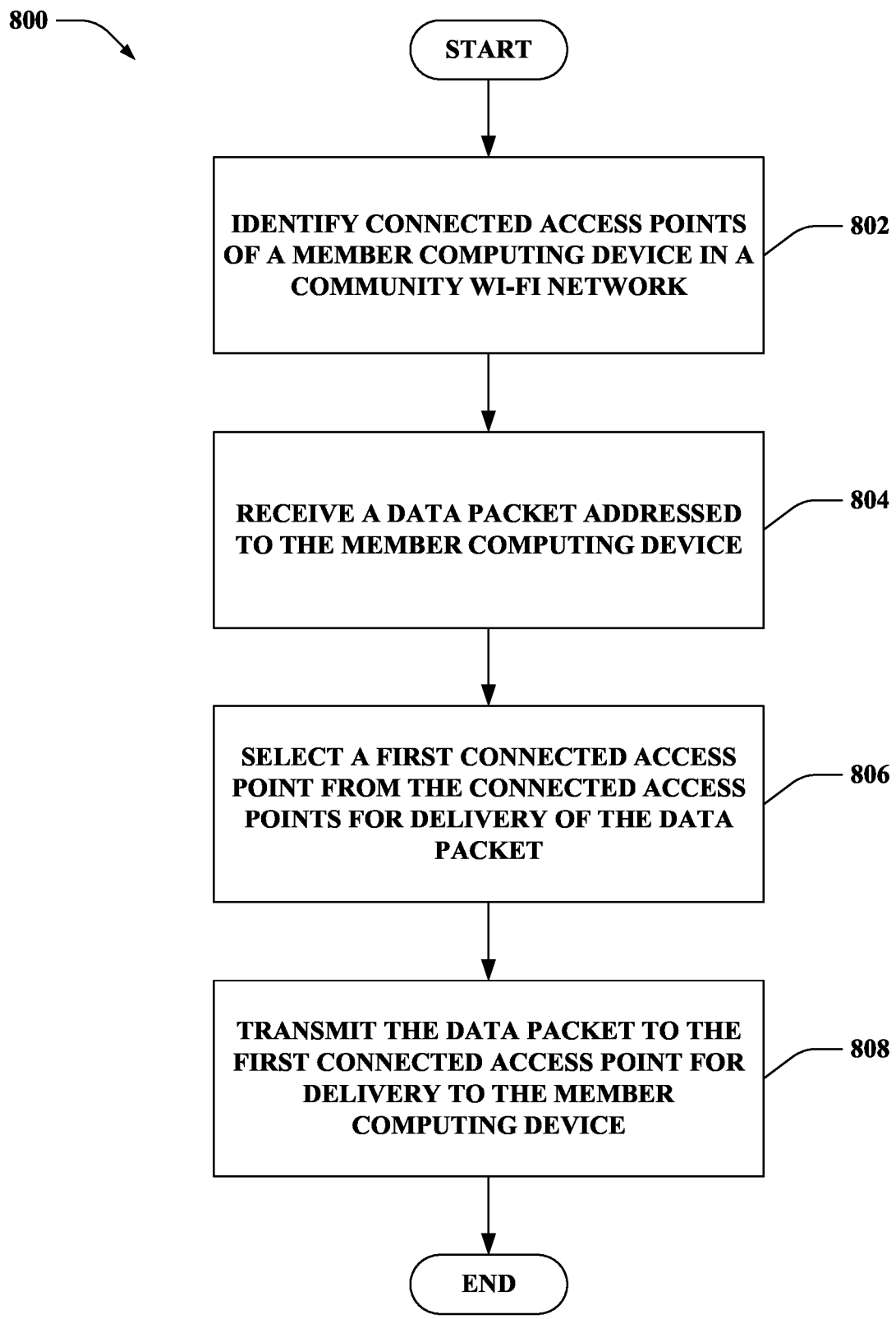
FIG. 8 is a flow diagram that illustrates an exemplary methodology of distributing a data packet from a community aggregation system.
Figure 9:
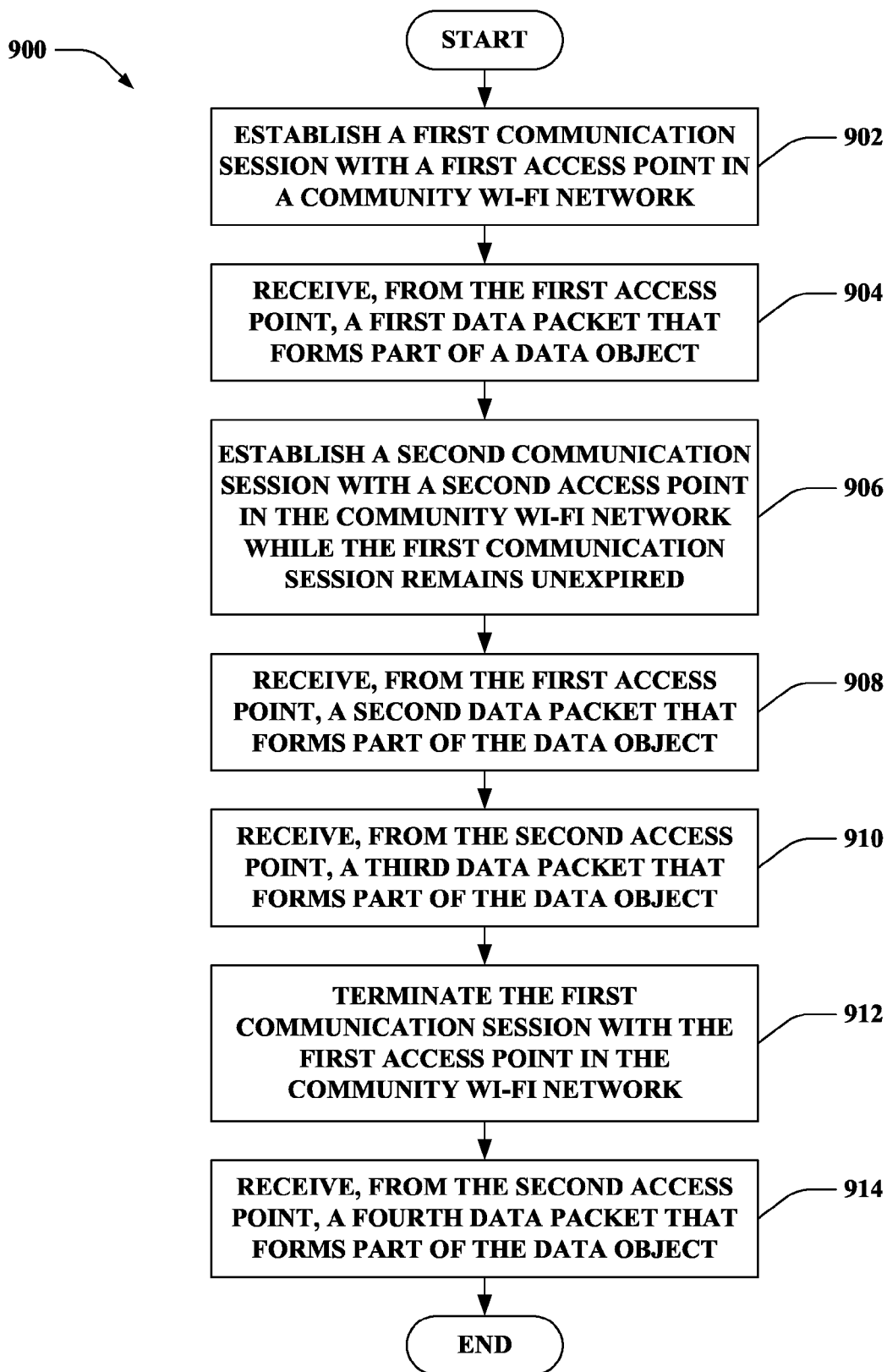
FIG. 9 is a flow diagram that illustrates an exemplary methodology of operating a member computing device in a community Wi-Fi network.

FIGS. 7-9 illustrate exemplary methodologies relating to configuring and utilizing a community Wi-Fi network. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 of configuring an access point in the local network. At 702, a request to join the access point to a community Wi-Fi network can be transmitted from the access point to a community aggregation system. The community Wi-Fi network can include disparate access points in disparate local networks that share respective network bandwidth capacities with member computing devices of the community Wi-Fi network. At 704, a firmware update can be received at the access point from the community aggregation system responsive to the request. At 706, the firmware update can be installed in memory of the access point. At 708, responsive to installation of the firmware update, network bandwidth capacity allocated to an account can be shared with the member computing devices of the community Wi-Fi network. The network bandwidth capacity allocated to the account is accessible via the access point.

Turning to FIG. 8, illustrated is a methodology 800 of distributing a data packet from a community aggregation system. At 802, connected access points of a member computing device in a community Wi-Fi network can be identified. The member computing device can have unexpired communication sessions with the connected access points. Moreover, the connected access points are in the community Wi-Fi network, where the community Wi-Fi network includes access points in differing local networks that share respective network bandwidth capacities with member computing devices of the community Wi-Fi network. At 804, a data packet addressed to the member computing device can be received. At 806, a first connected access point from the connected access points can be selected for delivery of the data packet. At 808, the data packet can be transmitted to the first connected access point for delivery to the member computing device.

With reference to FIG. 9, illustrated is a methodology 900 of operating a member computing device in a community Wi-Fi network. At 902, a first communication session can be established with a first access point in the community Wi-Fi network. At 904, a first data packet that forms part of a data object can be received from the first access point. At 906, a second communication session can be established with a second access point in the community Wi-Fi network while the first communication session remains unexpired. Responsive to establishment of the second communication session, a second data packet that forms part of the data object can be received from the first access point at 908. Moreover, responsive to establishment of the second communication session, a third data packet that forms part of the data object can be received from the second access point at 910. At 912, the first communication session with the first access point in the community Wi-Fi network can be terminated. At 914, responsive to termination of the first communication session, a fourth data packet that forms part of the data object can be received from the second access point.

Figure 10:
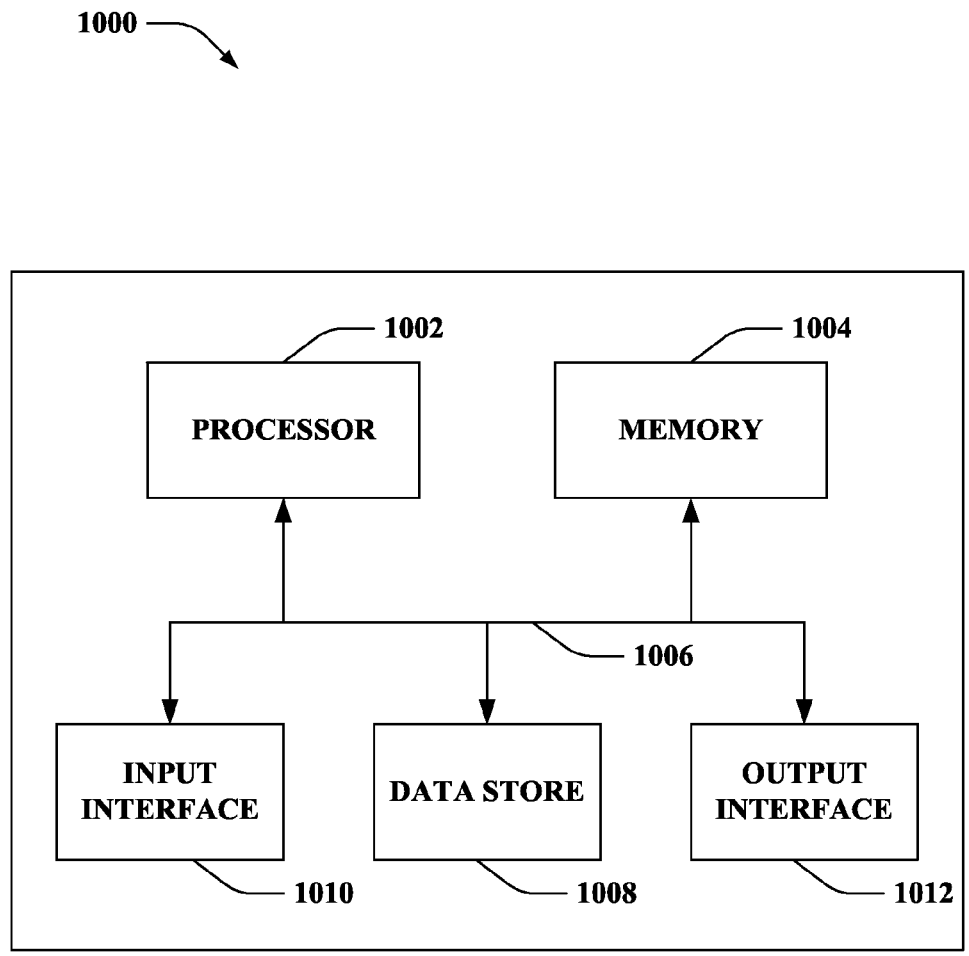
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be an access point (e.g., the access point A 102, the access point B 106, the access point C 108, one of the disparate access point(s) 302, one of the access points 602, etc.). By way of another example, the computing device 1000 can be used in the community aggregation system 124. Pursuant to yet another example, the computing device 1000 can be a member computing device (e.g., one of the member computing devices 122, the member computing device 304, one of the member computing devices 508-512, etc.). The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store data packets, firmware updates, certificates, connection data, and so forth. Moreover, according to an example where the computing device 1000 is an access point, firmware retained in the memory 1004 can be updated as described herein.

The computing device 1000 additionally includes a data store 1008 that is accessible by the processor 1002 by way of the system bus 1006. The data store 1008 may include executable instructions, data packets, firmware updates, certificates, connection data, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of configuring an access point in a local network, comprising:
   transmitting, from the access point to a community aggregation system, a request to join the access point to a community Wi-Fi network, wherein the community Wi-Fi network comprises disparate access points in disparate local networks that share respective network bandwidth capacities with member computing devices of the community Wi-Fi network;
   receiving, at the access point, a firmware update from the community aggregation system responsive to the request;
   installing the firmware update in memory of the access point, wherein:
      a first Service Set Identifier (SSD) mapped to the local network remains configured upon installation of the firmware update; and
      installation of the firmware update configures a second SSID mapped to the community Wi-Fi network; and
   responsive to the installation of the firmware update, sharing network bandwidth capacity allocated to an account with the member computing devices of the community Wi-Fi network, wherein the network bandwidth capacity allocated to the account is accessible via the access point.

2. The method of claim 1, further comprising:
   receiving a data packet that comprises the second SSID mapped to the community Wi-Fi network from one of the member computing devices of the community Wi-Fi network; and
   based upon the second SSID mapped to the community Wi-Fi network, routing the data packet to the community aggregation system utilizing the network bandwidth capacity allocated to the account.

3. The method of claim 1, wherein at least one of the disparate access points in the disparate local networks is configured to use the second SSID mapped to the community Wi-Fi network.

4. The method of claim 1, wherein at least one of the disparate access points in the disparate local networks is configured to use a third SSID mapped to the community Wi-Fi network, wherein the second SSID differs from the third SSID.

5. The method of claim 1, further comprising:
   receiving, at the access point from the community aggregation system, a certificate for authenticating the access point in the community Wi-Fi network;
   initializing a communication session with a particular member computing device in the community Wi-Fi network; and
   responsive to initialization of the communication session, transmitting the certificate for authenticating the access point in the community Wi-Fi network from the access point to the particular member computing device.

6. The method of claim 1, further comprising:
   initializing a communication session with a particular member computing device in the community Wi-Fi network;
   receiving, at the access point, a certificate from the particular member computing device; and
   authenticating the particular member computing device utilizing the certificate;
   wherein, responsive to authentication, the network bandwidth capacity allocated to the account is shared with the particular member computing device in the communication session.

7. A community aggregation system, comprising:
   at least one processor; and
   memory that comprises computer-executable instructions that when executed by the at least one processor, cause the at least one processor to perform act including;
   identifying connected access points of a member computing device in a community Wi-Fi network, wherein the member computing device has unexpired communication sessions with the connected access points, wherein the connected access points are in the community Wi-Fi network and each have a first Service Set Identifier (SSID) mapped to a corresponding local network and a second SSID mapped to the community Wi-Fi network, and wherein the community Wi-Fi network comprises access points in differing local networks that share respective network bandwidth capacities with member computing devices of the community Wi-Fi network;
   receiving a data packet addressed to the member computing device;
   selecting a first connected access point from the connected access points for delivery of the data packet; and
   transmitting the data packet to the first connected access point for delivery to the member computing device.

8. The community aggregation system of claim 7, the memory further comprising computer-executable instructions that, when executed by the at least one processor, cause at least one processor to perform acts including:
  predicting motion of the member computing device over time; and
  determining an anticipated geographic location of the member computing device at a time of delivery of the data packet based upon the predicted motion;
  wherein the first connected access point is selected for delivery of the data packet based upon the anticipated geographic location of the member computing device.

9. The community aggregation system of claim 8, wherein the data packet forms part of a data object, and the memory further comprising computer-executable instructions that, when executed by the at least one processor, cause the at least one processor to perform acts including:
  selectively managing compression of the data object as a function of the predicted motion of the member computing device over time.

10. The community aggregation system of claim 7, the memory further comprising computer-executable instructions that, when executed by the at least one processor, cause the at least one processor to perform acts including:
  selecting a second connected access point from the connected access points for duplicate delivery of the data packet; and
  transmitting the data packet to the first connected access point and the second connected access point.

11. The community aggregation system of claim 7, the memory further comprising computer-executable instructions that, when executed by the at least one processor, cause the at least one processor to perform acts including:
  receiving a second data packet addressed to the member computing device, wherein the data packet and the second data packet form part of a data object;
  selecting a second connected access point from the connected access points for delivery of the second data packet; and
  transmitting the second data packet to the second connected access point for delivery to the member computing device.

12. The community aggregation system of claim 11, the memory further comprising computer-executable instructions that, when executed by the at least one processor, cause least one processor to perform acts including:
  performing load balancing of data traffic with the member computing device across at least the first connected access point and the second connected access point.

13. The community aggregation system of claim 7, the memory further comprising computer-executable instructions that, when executed by the at least one processor, cause the at least one processor to perform acts including:
  receiving, from the member computing device via one of the connected access points, connection data indicating the connected access points of the member computing device.

14. The community aggregation system of claim 7, the memory further comprising computer-executable instructions that, when executed by the at least one processor, cause the at least one processor to perform acts including:
  selecting the first connected access point based at least in part upon costs of the respective network bandwidth capacities of the connected access points.

15. The community aggregation system of claim 7, the memory further comprising computer-executable instructions that, when executed by the at least one processor, cause the at least one processor to perform acts including:
  receiving a request from an access point to join the community Wi-Fi network; and
  transmitting a firmware update to the access point responsive to receipt of the request.

16. The community aggregation system of claim 15, the memory further comprising computer-executable instructions that, when executed by the at least one processor, cause the at least one processor to perform acts including:
  transmitting, to the access point, a certificate for authenticating the access point in the community Wi-Fi network.

17. A method of operating a member computing device of a community Wi-Fi network, comprising:
  establishing a first communication session with a first access point in the community Wi-Fi network, wherein the community Wi-Fi network comprises access points in differing local networks that share respective network bandwidth capacities with member computing devices of the community Wi-Fi network, the access points each having a first Service Set Identifier (SSID) mapped to a corresponding local network and a second SSID mapped to the community Wi-Fi network;
  receiving, from the first access point, a first data packet that forms part of a data object;
  establishing a second communication session with a second access point in the community Wi-Fi network while the first communication session remains unexpired;
  responsive to establishment of the second communication session:
    receiving, from the first access point, a second data packet that forms part of the data object; and
    receiving, from the second access point, a third data packet that forms part of the data object;
  terminating the first communication session with the first access point in the community Wi-Fi network; and
  responsive to termination of the first communication session, receiving, from the second access point, a fourth data packet that forms part of the data object.

18. The method of claim 17, wherein the first data packet, the second data packet, the third data packet, and the fourth data packet each comprise the second SSID mapped to the community Wi-Fi network.

19. The method of claim 17, further comprising transmitting connection data indicating access points with which the member computing device has unexpired communication sessions established.

20. The community aggregation system of claim 15, the memory further comprising computer-executable instructions that, when executed by the at least one processor, cause the at least one processor to perform acts including:
  transmitting the firmware update comprising instructions to configure the second SSID at the access point from which the request is received such that the first SSID mapped to a local network of the access point remains configured at the access point.

* * * * *